March 10, 1970 A. H. ELLSON 3,500,467

MAGNETIC INFORMATION STORAGE MATRICES

Filed May 25, 1964

INVENTOR.
ALLAN H. ELLSON
BY
Frank R. Trifari
AGENT

United States Patent Office 3,500,467
Patented Mar. 10, 1970

3,500,467

MAGNETIC INFORMATION STORAGE MATRICES

Allen Henry Ellson, Whyteleaf, Surrey, England, assignor, by mesne assignments, to U.S. Philips Corporation, New York, N.Y., a corporation of Delaware

Filed May 25, 1964, Ser. No. 369,736
Claims priority, application Great Britain, May 24, 1963, 20,793/63
Int. Cl. G11b *17/00*
U.S. Cl. 340—174 9 Claims

ABSTRACT OF THE DISCLOSURE

A non-destructive core memory in which each core selected for permanent storage is saturated with a permanent magnetic field. The field is generated by placing a permanently magnetized plate with mutually opposite poles on its two major surfaces adjacent to a core matrix and by replacing a section of plate material adjacent to the selected core with a material having a substantially higher magnetic permeability than air and a magnetic remanence substantially less than that of the plate.

Figure 1:
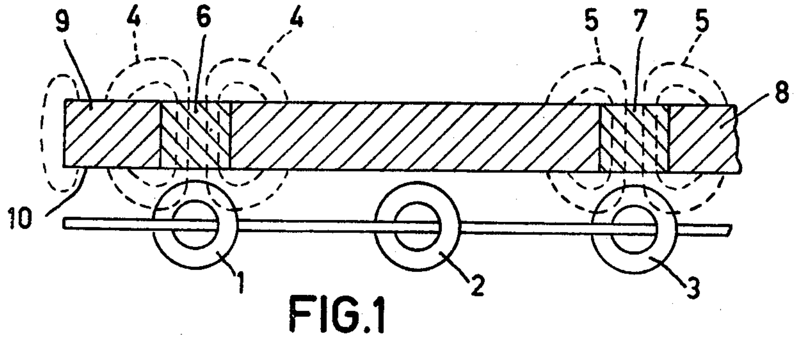

This invention relates to information storage matrices employing magnetic cores.

Such matrices usually comprise annular cores of so-called square-loop ferrite material with a plurality of conductors passing through each core. The cores of such matrices are generally arranged in a number of parallel rows and parallel columns with a wire or wires passing through the cores of each row and a wire or wires passing through the cores of each column.

Some applications require a memory matrix in which a preset information pattern is stored, which pattern will not be destroyed by read operations. My prior application, filed jointly with Alexander Donald Main, Ser. No. 268,668 and now U.S. Patent No. 3,403,389 filed Mar. 8, 1963, whose contents are hereby incorporated by reference, describes a method of storing a preset information pattern in a memory matrix by saturating with discrete permanent magnetic fields those cores selected to be inoperative in accordance with the pattern of fixed information. The said discrete permanent magnetic fields being obtained by using, in combination with an array of magnetic cores arranged in rows and columns, a permanently magnetized inhibiting plate having an area equal to or greater than that of the said array and having apertures corresponding to the cores which are to become inoperative.

The said plate has a north pole distributed over one of its faces and a south pole distributed over its other face and is arranged close to or in contact with the cores.

With such an arrangement magnetic flux linking the front and back faces of the plate tends to concentrate at the outer edges of the plate and at its apertures, i.e. where the flux paths are shortest. Because of this fact the apertures are located where cores are to be inhibited by magnetic saturation.

The aforementioned patent application describes also the enhancing of the desired effect by the use of an auxiliary continuous plate. The said auxiliary plate is permanently magnetized in the direction opposite to that of the inbibiting plate and may be placed close to or in contact therewith on the side remote from the cores. The auxiliary plate may also be placed close to the cores or in contact therewith on the side remote from the inhibiting plate.

It has been found that matrices manufactured according to our prior application require their magnetic cores to be situated in accurate positions relative to each other and to the inhibiting plate, because the magnetic flux obtained at the apertures is not sufficiently dense to allow much latitude in the placing of the cores relative to it.

It is an object of the present invention to provide an improved form of memory matrix in which a preset information pattern can be stored without the need for such accurate positioning of the magnetic cores.

According to the invention an information storage matrix comprises an array of magnetic cores effectively arranged in rows and columns in combination with a permanently magnetized inhibiting plate extending over an area equal to or greater than that of the said array. A north pole is distributed over one of its faces and a south pole distributed over its other face. The plate is arranged close to or in contact with the cores. Plugs of a material having materially higher magnetic permeability than air and magnetic remanence materially less than that of the main body of the plate are inserted into the plate adjacent a core selected for permanent memory storage so that the said cores to which they correspond are rendered inoperative.

It has been found that the inclusion of a material of high magnetic permeability in the apertures in the inhibiting plate leads to a substantial increase in the magnetic flux density obtained at the locations of the cores whose action it is desired to inhibit. The tolerances on the placing of these cores thus become less stringent than those normally necessitated by the construction of memory matrices according to our prior application.

The inhibiting flux is obtained at the apertures of the plate and for this reason such apertures are located where cores are to be inhibited by magnetic saturation. On the other hand the arrangement must be such that the relatively weak field near the unperforated parts of the plate is not sufficient to influence the operation of the corresponding cores. With the arrangement described, flux linking the front and back faces of the plate tends to concentrate at the outer edges of the plate as well as the permeable material in its apertures, i.e. where the flux paths are shortest. Thus, unless an auxiliary plate is used as described in our prior application the outer edges of the plate must be located well beyond the edges of the core array so that the cores at the outer edges of the plate are not influenced by the peripheral fringing flux.

The main body of the inhibiting plate may be made entirely of a permanently magnetizable metal. Alternatively, it may comprise a non-metallic non-magnetic substance impregnated with a permanent-magnetic substance in powder form, the latter material being, for example, a ferrite.

The material of the plugs of the inhibiting plate corresponding to the cores it is desired to inhibit is preferably a material with high magnetic permeability and little or no magnetic remanence. It may for example comprise one of the forms of soft iron available such as iron filings, so-called carbonyl iron powder, or so-called electrolytic iron powder, the individual particles of any of these being held together and in the apertures by mixing them with a suitable binder such as silicon-rubber, poly-vinyl acetate, or epoxy-resin, and applying the mixture to the apertures.

The effect of the inhibiting plate may be enhanced by the use of a continuous auxiliary plate, the said auxiliary plate being permanently magnetized in the direction opposite to that of the inhibiting plate and being placed close to the inhibiting plate or in contact therewith on the side remote from the cores or placed close to the cores or in contact therewith on the side remote from the inhibiting plate. If such an auxiliary plate is used it may be made of the same material as the inhibiting plate.

Three of the possible embodiments of the invention will be described, by way of example, with reference to FIG- URES 1 to 3 of the accompanying drawings which are in diagrammatic form.

FIGURE 1 shows a simple embodiment as a fragmentary section taken in a plane normal to the matrix plane (wires normal to the plane of the drawing are omitted for simplicity).

Figure 2:
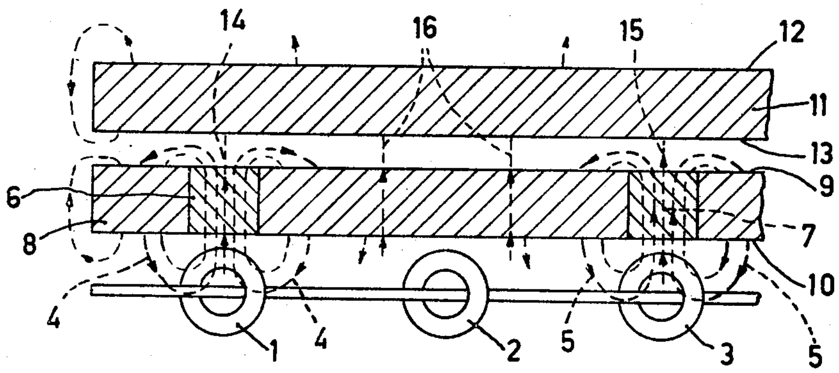
Figure 3:
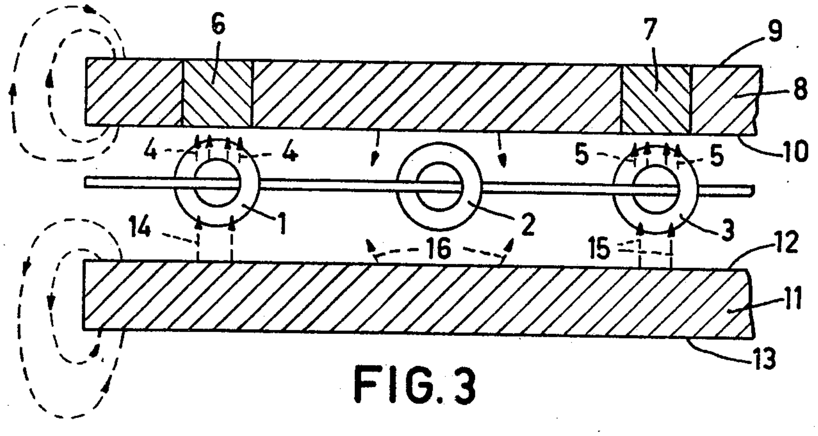

FIG. 2 shows an identical view of the core memory of FIG. 1 and a similar section taken through the plates of an alternate embodiment of my invention. FIG. 3 shows an identical view of the core memory of FIGS. 1 and 2 and a similar section taken through the plates of preferred embodiment of my invention. Numerals 1, 2 and 3 denote magnetic cores adjacent to a permanently magnetized inhibiting plate 8. The cores 1 and 3 are inhibited by the magnetic flux 4 and 5 which passes through plugs 6, 7 of magnetically permeable material respectively. The apertures containing plugs 6 and 7 are arranged adjacent to those cores 1, 3 which are to be inhibited. The plugs serve to effect an increase in the magnetic flux density at the locations of those cores 1 and 3. The magnetic field is generated by virtue of the fact that the plate 8 of permanent magnetic material is magnetized with a north pole on one of the faces, 9, 10, and with a south pole on the other. In order that the core 2 may not be inhibited also, this magnetization must be of lower value than that which would cause such inhibition.

FIGURES 2 and 3 depict the type of field distortion which occurs when an auxiliary plate 11 is added to the arrangement shown in FIGURE 1. The auxiliary plate 11 is so magnetized that a magnetic pole exists at the face 12 of the same sign as that which exists at the face 10 of the inhibiting plate. Similarly a magnetic pole exists at the face 13 of the auxiliary plate, of the same sign as that which exists at the face 9 of the inhibiting plate. The effect of the auxiliary plate's opposing field 16 is thus to substantially cancel the perpendicular magnetic field existing at the edges of the inhibiting plate and at the location of the core 2. While the auxiliary plate's assisting field 14 and 15 increase still further the magnetic field through the cores 1 and 3 by assisting fields 4 and 5 respectively.

Two examples will now be given of suitable materials for which the inhibiting plate may be made.

EXAMPLE I

The inhibiting plate may be made from polyvinylchloride sheeting impregnated with 78% or more (for example 85%) by weight of powder of a permanent-magnetic ferrite material available under the registered trademark "Magnadur."

EXAMPLE II

The inhibiting plate may be a mixture of chlorosulphonated polyethylene and polyisobutylene impregnated with 89% by weight of "Magnadur."

If the materials given in either of these two examples are used the inhibiting plate should preferably be at least one-sixteenth of an inch thick.

Instead of the simple array of magnetic cores described a two-core-per-bit system may be used. In this system two cores together represent each bit in a word and the sense wire threads both of these in a direction such that their outputs (and any stray induced signals) exactly cancel. If one of the cores in inhibited an output of plus V is sensed while, if the other core is inhibited, an output of minus V is sensed.

As a first modification the invention may be applied to arrangements in which the magnetic cores are constituted by thin film elements deposited on a base, e.g. by evaporation.

As a second modification the invention may be applied to matrices employing a plate of magnetic material having a regular pattern of holes where the cores are, in effect, constituted by the material surrounding such holes.

What is claimed is:

1. An information storage matrix comprising an array of saturable magnetic cores arranged in a row each of said cores being inoperable in the presence of a fixed magnetic field of sufficient intensity to saturate the core, a permanently magnetized inhibiting plate having at least two faces and extending over an area at least equal to that of said array and having a north pole distributed over one of said faces of said plate and a south pole distributed over another face of said plate, said cores being positioned adjacent one of said polarized faces and remote from the other said polarized face of said plate, and a plug extending through and fixed within said inhibiting plate adjacent each core to be rendered inoperative, said plug being composed of a substance having a higher magnetic permeability than air and a magnetic remanence less than that of the main body of the plate thereby to concentrate said magnetic field of said plate within said selected core to an intensity sufficient to render said selected core inoperable.

2. A matrix as claimed in claim 1 wherein the core array comprises a plate of magnetic material having a regular pattern of holes.

3. A matrix as claimed in claim 1 wherein said magnetic cores are constituted by thin film elements deposited on a base.

4. A matrix as claimed in claim 1 wherein said material of said plug is soft iron mixed with a binder.

5. A matrix as claimed in claim 4 wherein said binder is epoxy-resin.

6. A matrix assembly comprising a storage matrix as claimed in claim 1, and a continuous auxiliary plate adjacent said matrix assembly, said auxiliary plate being permanently magnetized with mutually opposite poles on two plate faces, one of said poles being oriented to face a similar pole of said inhibiting plate.

7. A matrix as claimed in claim 6 wherein at least one of said plates is composed of a non-metallic non-magnetic material impregnated with permanent-magnetic material in powder form.

8. A matrix as claimed in claim 7 wherein the material in powder form is ferrite material.

9. A matrix as claimed in claim 7 wherein the non-magnetic material is a mixture of chlorosulphonated polyethylene and polyisobutylene.

References Cited

UNITED STATES PATENTS

| | | | |
|---|---|---|---|
| 3,292,165 | 12/1966 | Post | 340—174 |
| 3,235,853 | 2/1966 | Luebbe | 340—174 |
| 3,014,102 | 12/1961 | Bianco et al. | 200—87 |

JAMES W. MOFFITT, Primary Examiner